(12) United States Patent  (10) Patent No.: US 8,672,374 B1
Webber  (45) Date of Patent: Mar. 18, 2014

(54) HOLDER FOR TABLET COMPUTER

(71) Applicant: Paul M Webber, Nipomo, CA (US)

(72) Inventor: Paul M Webber, Nipomo, CA (US)

( * ) Notice: Subject to any disclaimer, the term of this patent is extended or adjusted under 35 U.S.C. 154(b) by 0 days.

(21) Appl. No.: 13/802,580

(22) Filed: Mar. 13, 2013

(51) Int. Cl.
*B65G 7/12* (2006.01)

(52) U.S. Cl.
USPC .......................................... 294/25; 224/217

(58) Field of Classification Search
USPC .................. 294/25, 137, 139, 215, 219, 65.5;
206/320; 224/217, 197, 218, 930;
248/682, 688; 361/679.56; D14/253,
D14/447; 16/421
See application file for complete search history.

(56) References Cited

U.S. PATENT DOCUMENTS

| D298,912 S | * | 12/1988 | Puntillo | D8/349 |
|---|---|---|---|---|
| D613,291 S | * | 4/2010 | Carver | D14/432 |
| D619,586 S | * | 7/2010 | Richter | D14/447 |
| D678,284 S | * | 3/2013 | Coulter | D14/412 |
| 2004/0226973 A1 | | 11/2004 | Kao | |
| 2007/0017944 A1 | * | 1/2007 | Marks | 224/217 |
| 2009/0219677 A1 | | 9/2009 | Mori et al. | |
| 2012/0025684 A1 | | 2/2012 | Trotsky | |
| 2012/0042476 A1 | | 2/2012 | Karmatz | |
| 2012/0043452 A1 | | 2/2012 | Karmatz | |
| 2012/0068043 A1 | | 3/2012 | Daigle et al. | |
| 2012/0075799 A1 | | 3/2012 | Pollex | |
| 2012/0097831 A1 | | 4/2012 | Olukotun et al. | |
| 2012/0118770 A1 | | 5/2012 | Valls et al. | |

* cited by examiner

*Primary Examiner* — Stephen Vu
(74) *Attorney, Agent, or Firm* — Hartman Titus PLC; Joseph W Mott

(57) ABSTRACT

A grip for holding a tablet computer in one hand while activating and using the device with the other hand comprises a stem connecting a base portion attached to the tablet and a top portion, with a central hole of appropriate size in the stem to accommodate a finger inserted through the grip. Opposing walls of the stem are biconcave in the plane perpendicular to the plane of the hole in the stem, defining a shape convenient for gripping between two fingers.

9 Claims, 5 Drawing Sheets

HOLDER FOR TABLET COMPUTER

CROSS REFERENCE TO RELATED APPLICATIONS

This application claims the benefit of U.S. Provisional Patent Application 61/749,504, filed Jan. 7, 2013.

BACKGROUND OF THE INVENTION

Tablet display devices have become popular consumer products for use in a variety of applications. Many such devices are flat, thin computers with a display panel on most of the area of one surface. Although the majority of these incorporate the computational, communication and display circuitry of a general purpose computer, some are more specialized for limited functionality, such as readers for electronic books or special map or industrial data displays. Typical dimensions are 8 in×10 in×½ in (similar to a tablet of paper) and 8 in×6 in×⅓ in (for so-called "mini" tablets), with weights ranging from about 2 pounds to just over ½ pound.

Wireless telephone communication devices with computer circuitry, known as "smartphones" have similar relative dimensions, but on a smaller scale. A growing trend has been to offer smaller tablets on the one hand and larger smartphones on the other, so that the sizes of the respective devices may converge. As used herein, the term "tablet computer" shall refer to any thin handheld device with a display panel on one surface and circuitry to generate a display on that surface.

Many uses involve operating the tablet computer while standing. While a tablet is light enough to hold in the hand, using it for any length of time may be tiring. A touch screen is operated with the fingers of the dominant hand, while the tablet is grasped with the other hand by its edge. The weight of the unit is applied to a moment arm that makes the user's grip difficult to maintain for an extended period of time. The tablet computer usually has a flat back that can be supported on the open palm of the off hand, but balancing the device is difficult while the touch screen is being activated.

The present invention addresses a need for a convenient way to hold a tablet computer in one hand while activating it with the other.

BRIEF SUMMARY OF THE INVENTION

The present invention provides a compact and convenient way to hold a tablet computer in one hand while activating and using the device with the other hand. The device, as seen in FIG. 1, is a small grip and stand that is to be attached at the approximate center of the tablet on the back, or underneath, side. In one embodiment, it is removably attachable to the tablet, and can serve as a handle or a small stand that elevates the tablet at a slight angle. A stem connects a base portion attached to the tablet and a top portion. A central hole of appropriate size in the stem accommodates a finger inserted through the grip. Opposing walls of the stem are biconcave in the plane perpendicular to the plane of the hole in the stem, defining a shape convenient for gripping between two fingers.

DETAILED DESCRIPTION

Figure 1:
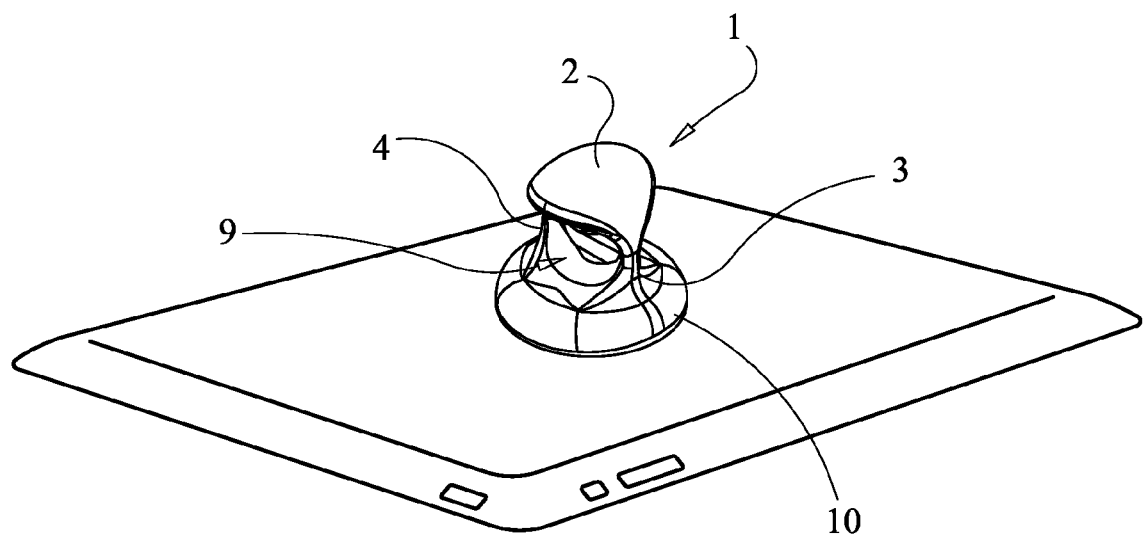
FIG. 1 shows a perspective view of one embodiment of the invention.
Figure 2:
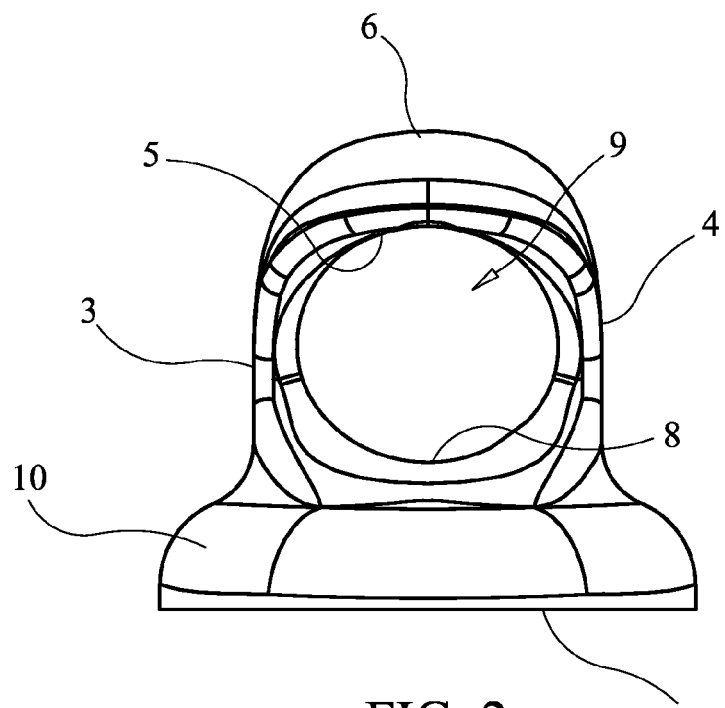
FIG. 2 shows an end view of the embodiment of FIG. 1.
Figure 3:
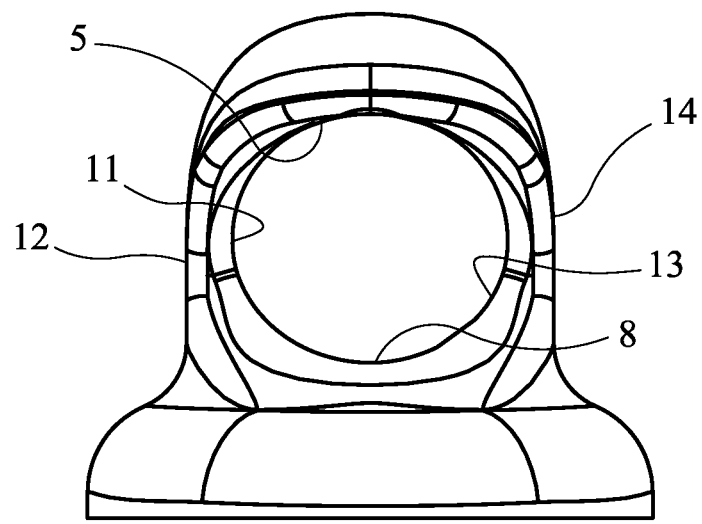
FIG. 3 shows an end view of the embodiment of FIG. 1.
Figure 4:
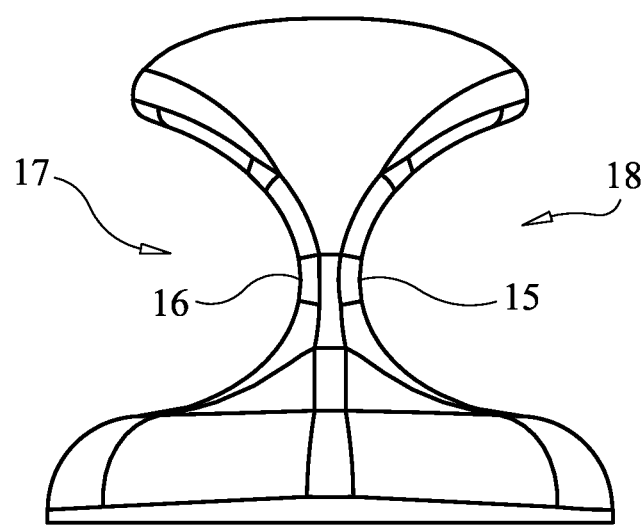
FIG. 4 shows a side view of the embodiment of FIG. 1.

One embodiment of the invention is shown in FIGS. 1-3. The holder 1 comprises a base 10, a top 2, and a pair of vertical support elements, 3 and 4, connecting the base 10 with the top 2. The top 2 has a lower surface 5 and an upper surface 6. The base has a lower surface 7 and an upper surface 8. The vertical support elements have facing inner surfaces 11 and 13 and outwardly facing surfaces 12 and 14. Each also has outwardly facing surfaces 15 and 16 in a plane orthogonal to the plane of inner surfaces 11 and 13. See FIG. 4.

Figure 5:
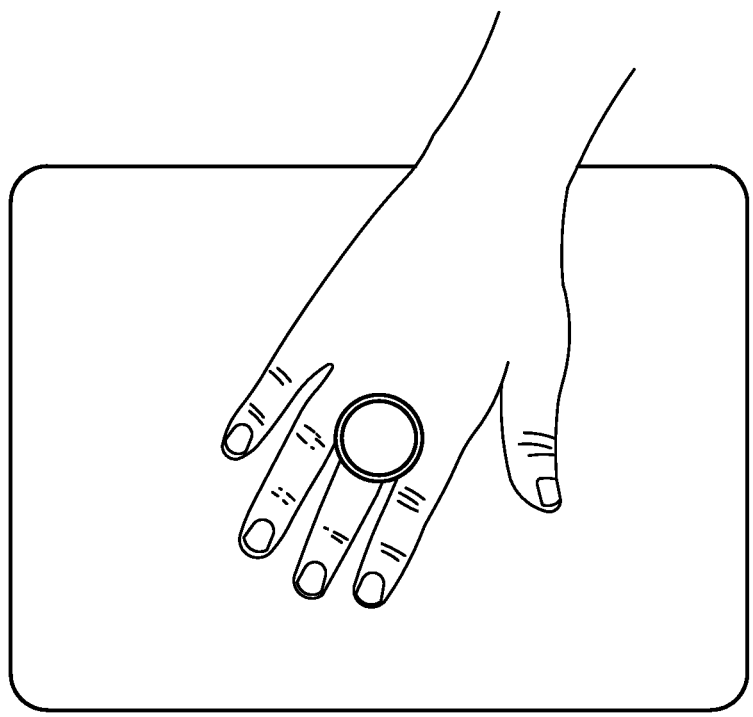
FIG. 5 shows a position of a user's hand when using an embodiment of the invention.

In this embodiment, the interior surfaces of the top, bottom, and sides define a generally-circular aperture space 9 sized to accept the insertion of a finger. The user can insert his finger with his palm toward the tablet, as in FIG. 5, or away from the tablet. A diameter of about 0.9 in is a good compromise for the size of aperture 9, but other dimensions may be desirable in particular applications. For example, it may be advisable to create three or more standard apertures to accommodate the different hand sizes of men, women and children.

Figure 6:
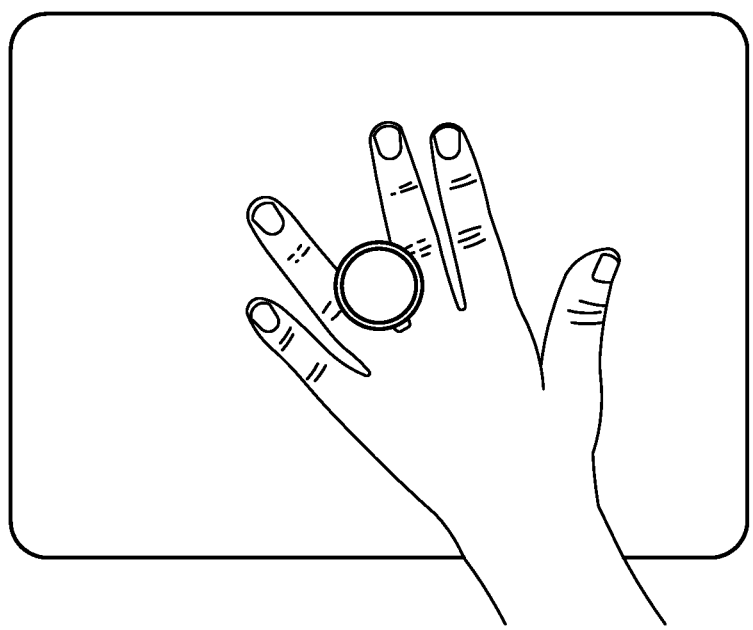
FIG. 6 shows an alternative position of a user's hand when using the embodiment of FIG. 6.

As may be seen in FIGS. 1-4, the vertical support elements 3 and 4 are curved inward in three directions, appearing as a triconcave pillar connecting the base and the top. The vertical support elements 3, 4 are concave in the plane of the finger aperture 9, each combining with the inner surface 5 of the top 2 and inner surface 8 of base 10 to define an approximate circle. In the plane perpendicular to the plane of the finger aperture, the vertical support elements are biconcave, defining back to back approximate half circles 17, 18 perpendicular to the finger aperture 9 with approximate diameters slightly larger than that of the finger aperture. The user may grasp the holder between two fingers, partially encased by the half circles, to comfortably support the tablet with one hand. See FIG. 6. In an embodiment, the outwardly facing surfaces 12 and 14 in the plane of the finger aperture 9 are relatively straight. These surfaces may take any shape consistent with the need for structural support of the top 2.

Figure 7:
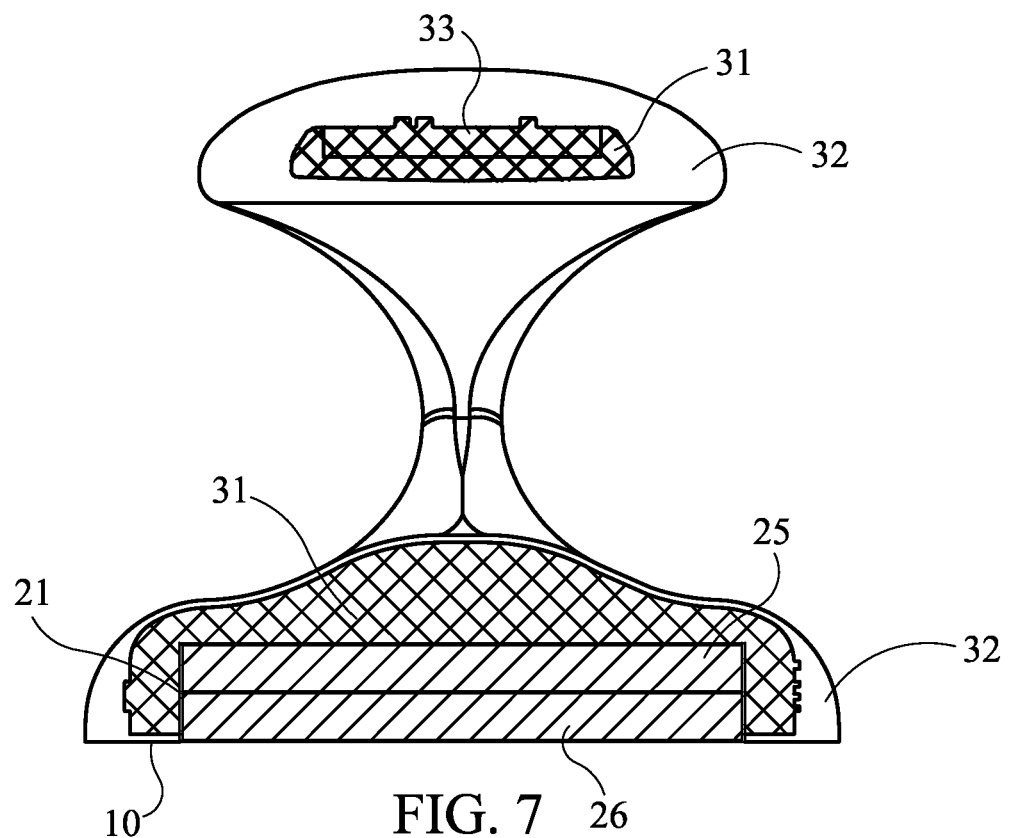
FIG. 7 shows a cross section through the center of the embodiment of FIG. 1.
Figure 8:
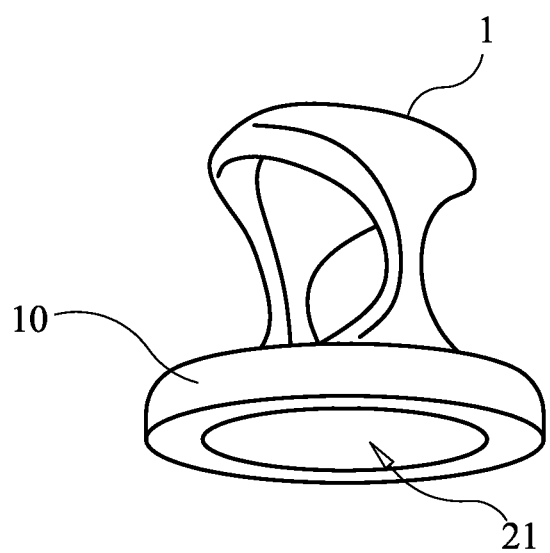
FIG. 8 is a perspective view showing a cavity in the base of an embodiment of the invention.

The holder device is attachable to the back of a tablet computer, and preferably is removably attachable. In one embodiment, attachment is accomplished using a pair of magnetic discs. See FIGS. 7 and 8. A holder magnet 25 is affixed in a cavity 21 in the base 10 of the holder device. The cavity 21 is just deep enough to envelop both the holder magnet 25 and a tablet magnet 26 affixed to the back of the tablet. In an embodiment, the base 10 is circular and the holder magnet 25 and the tablet magnet 26 are circular discs, a configuration that permits easy orientation of the finger aperture 9 when the holder is attached to the tablet.

In an embodiment, the holder magnet 25 and tablet magnet 26 are plated magnetic discs, each about 0.125" thick, with attracting poles directed toward each other, providing a strong bond that can be broken with the deliberate application of moderate force. In another embodiment, the holder magnet 25 is a strong magnetic disc and the tablet attachment component 26 is a 16 gauge polished steel disc or a magnetic metal of suitable thickness. Known pressure sensitive adhesive tapes or materials may be used to affix the tablet attachment disc to the back of the tablet computer without damaging the tablet.

Figure 9:
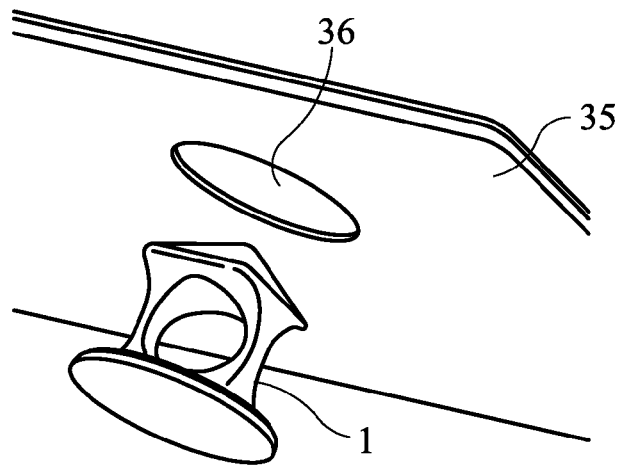
FIG. 9 shows an embodiment of the invention that uses a tablet back cover to secure the holder to the tablet, with the holder and cover separated.
Figure 10:
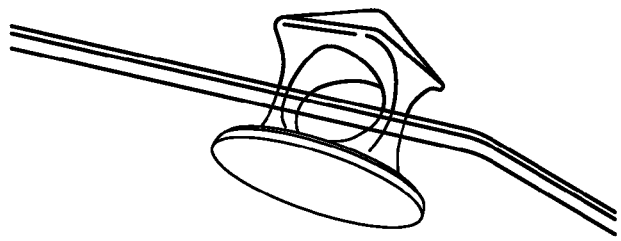
FIG. 10 shows the embodiment of FIG. 9 with the holder in place in the back cover.

Persons of skill in the art will readily understand that attachment of the holder to the computer tablet may alternatively be accomplished in many other ways. FIGS. 9 and 10, for example, show a back cover 35 with an aperture 36 through which the holder 1 is removably inserted. In this embodiment, when the holder 1 is not in place, the cover 35 could conveniently remain on the tablet without distorting the tablet's thin profile. It may be noted that in the illustration, the top of the holder comprises an alternative configuration to the curved top shown in other embodiments.

Figure 11:
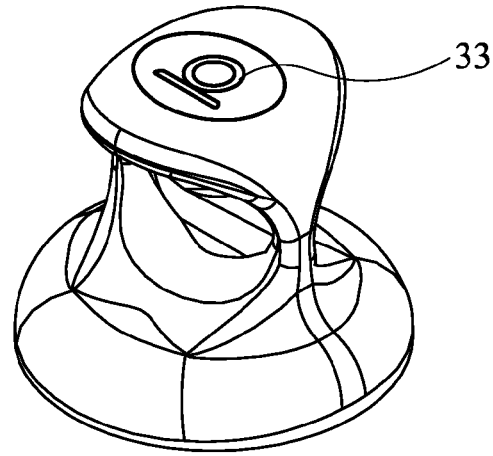
FIG. 11 shows an embodiment of the invention with a design disc in place.

The holder device may be fabricated or constructed of a variety of materials, with polymers or plastics particularly suitable. In an embodiment, a hard plastic molded endoskeleton 31 is enveloped by a softer plastic or polymer overmold 32. The overmold skin, which in one embodiment is about 0.02 in thick, can be clear, revealing the endoskeleton, or any of a variety of colors. The skin may be seamless and sanitizable, for use in clean environments such as medical operating rooms. In some embodiments, the endoskeleton 31 may be configured to hold a dime-sized disc 33 that may incorporate a printed, engraved or embossed design or logo. See FIG. 11.

The foregoing description has been presented and is intended for the purposes of illustration and description. It is not intended to be exhaustive nor limit the invention to the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

I claim:

1. A holder attachable to the back of a tablet computer, comprising
    a top portion having upper and lower surfaces;
    a bottom portion having upper and lower surfaces; and
    a pair of triconcave vertical support elements connecting the top portion and the bottom portion, each having inner, outer, front and back surfaces, wherein the front and back surfaces are in a plane approximately orthogonal to the plane of the inner and outer surfaces;
    wherein the lower surface of the top portion, the upper surface of the bottom portion and the inner surfaces of the support elements define an approximately circular aperture for insertion of a finger; and
    wherein the front and back surfaces of each support element form a biconcave pillar with curvature sized to accommodate a finger.

2. The holder of claim 1 wherein the holder is removably attachable to the tablet computer.

3. The holder of claim 2 further comprising an open cavity in the bottom portion, a first magnet affixed in the cavity, and a second magnetic element affixed to the tablet back that fits into the cavity and is attracted to the first magnet.

4. The holder of claim 3 wherein the second magnetic element is a magnet.

5. The holder of claim 3 wherein the bottom portion is approximately circular, the first magnet is a disc and the second magnetic element is a disc magnet.

6. The holder of claim 3 wherein the bottom portion is approximately circular, the first magnet is a disc and the second magnetic element is a steel disc.

7. The holder of claim 1 comprising a molded hard plastic endoskeleton enveloped by a soft plastic overmold.

8. The holder of claim 7 further comprising a disc for decorative display attached to an upper surface of the endoskeleton.

9. The holder of claim 1 further comprising a disc for decorative display attached to the upper surface of the top portion.

\* \* \* \* \*